United States Patent [19]
Janach et al.

[11] 4,007,800
[45] Feb. 15, 1977

[54] FORCE MEASURING DEVICE

[75] Inventors: Walter Janach, Morges; Peter Kipfer, Jegenstorf, both of Switzerland

[73] Assignee: Haenni & Cie Aktiengesellschaft, Bern, Switzerland

[22] Filed: July 15, 1975

[21] Appl. No.: 596,143

[30] Foreign Application Priority Data

July 17, 1974 Switzerland .................. 9922/74

[52] U.S. Cl. .............................. 177/209; 177/225
[51] Int. Cl.² ...................... G01G 5/04; G01G 3/00
[58] Field of Search .......... 177/208, 209, 229, 225

[56] References Cited

UNITED STATES PATENTS

| 2,107,883 | 2/1938 | Benedek | 177/209 |
| 2,314,011 | 3/1943 | Maurer | 177/209 X |
| 2,886,301 | 5/1959 | Aske | 177/209 |
| 2,932,501 | 4/1960 | Hicks | 177/209 |
| 3,191,701 | 6/1965 | Gray | 177/209 |

FOREIGN PATENTS OR APPLICATIONS

| 63,188 | 8/1968 | Germany | 177/209 |

*Primary Examiner*—George H. Miller, Jr.
*Attorney, Agent, or Firm*—Holman & Stern

[57] ABSTRACT

A force measuring device comprises at least one gauge element which, at least, in some regions, is conceived as a spring element, the deformation of which changes the volume of liquid contained in a chamber delimited by the gauge element; the spring elements are equal to each other in every respect and so positioned that the spring characteristic is the same for all of them that the deformation remains in the linear domain of the spring characteristic and that the local change of volume of the chamber is proportional to the deformation of the respective spring element.

3 Claims, 11 Drawing Figures

FORCE MEASURING DEVICE

FIELD OF THE INVENTION

The invention relates to a force measuring device with a member distributing the applied force on to a gauge element, which gauge element is elastically deformable at least in some regions, whereby the deformation movement of the gauge element is imposed onto at least one wall of at lest one liquid chamber and the change of volume of said chamber resulting from said deformation movement is measured.

BACKGROUND OF THE INVENTION

Particularly when weighing loads, e.g. of vehicles, there is a need for a device having a small thickness, onto which the load can be posed or the vehicle can be driven with one or a number of wheels; frequently the load must be applicable on a surface either off center or with any kind of distribution and in each such case the result of the measurement should not be affected by any errors.

It is well known that dynameters of various kinds are used to measure forces, e.g. devices with strain gauges, piezoelectric transducers or functioning with hydraulic principles.

A weighing device with the load resting on a liquid cushion is known from the FR-PS 71.22394. As a result of the pressure being equal everywhere in the cushion, the applied force is always fixed to the center of pressure of the cushion and it cannot be displaced off center.

An axle weighing scale with similar principle is known from U.S. Pat. No. 3,150,729. Here the load, which always acts in the same location, is equally carried and thereby measured by means of the pressure generated in a capsule. On the scale apparatus known from U.S. Pat. No. 3,752,245, the load is applied on to an elastic plate, which also rests on a liquid cushion. As the deflection of the plate changes according to the location where the force is applied, the resulting liquid pressure does not remain the same when the force acts off center.

Two similar weighing devices which are mounted on the pivot axis of a tractor truck or more generally between the load bearing structure of a vehicle and its axis, are known from U.S. Pat. No. 2,646,272 and U.S. Pat. No. 2,680,103. The load is transmitted onto an annular liquid chamber by an elastic plate and the resulting liquid pressure is measured. Here the correct functioning also depends on the load being applied symmetrically, because otherwise the resulting pressure will not remain the same.

U.S. Pat. No. 3,166,134 discloses a weighing device in which the load is carried by the pressure generated in a flexible liquid enclosure and is thereby measured. For the case when the load is applied off center, provision is taken for the total bearing surface of the liquid pressure to remain unchanged. As a result the pressure is proportional to the load.

The road-bearing meter according to U.S. Pat. No. 1,458,920 contains as gauge element a coil of thick walled tubing made of resilient material, which is filled with liquid. Upon loading the tubing, which acts as a progressive spring, is squeezed, whereby a liquid pressure is generated, which serves as the measurement signal. When the loadis applied off center, the liquid pressure cannot remain the same because the reduction of the open cross sectional area of the tubing is not proportional to the deforming force.

SUMMARY AND OBJECTS OF THE INVENTION

The objective of the invention, to ensure that the applied force can be laterally displaced, in particular under the requirement of a small thickness, is inventively realized by a force measuring device of the initially described kin, whereby the gauge element is conceived as a spring element in the deformable regions, all spring elements are equal in every respect and are positioned relative to the distributing member as well as relative to the liquid chamber in such a way that the spring characteristic is the same for all spring elements, that said deformation remains in the linear domain of said spring characteristic and that the local change of volume of said liquid chamber is proportional to the deformation of said spring element, the factor of proportionality being the same for all spring elements.

In such a configuration, the resulting change of volume of the liquid chamber serves as a measure for the applied force. Provided that measures are taken through proper choice of shape and material of the gauge element to ensure that in all locations of force transmission the proportionality between force and local change of volume of the liquid chamber is the same, the total change of volume of the liquid chamber represents in any case a unique measure of the sum of all components of the applied force, independently of how the force components are distributed over the individual deformable regions of the gauge element. The proportionality between every single force component and the local change of volume of the liquid chamber with the same constant of proportionality everywhere is achieved by the gauge element being conceived as a spring element in the loaded and deformable regions, whereby the force components are applied in the same manner on all spring elements, the spring characteristic is the same for all spring elements, the deformation of all spring elements remains in the linear domain of the spring characteristic and the local change of volume of the liquid chamber is proportional to the deformation of the spring element, the factor of proportionality being the same for all spring elements, this in order that the liquid displacements from the individual spring elements can simply be added to each other to obtain the measure for the total applied force.

It is evident that the two most important requirements, i.e. the small thickness and the possibility to apply the force off center, are achieved with this invention and that this can be realized with rather simple means. In particular it is remarkable that the sum of all partial results from the individual spring elements is obtained in an extremely simple way as the simple sum of the liquid displacements in the single chamber and that at the same time the total amount of displaced liquid—as a measure of the applied force—can be easily measured e.g. by means of a capillary tube or a capsule of an indicator device.

In the following the invention is described by means of a number of examples, whereby:

DESCRIPTION OF PREFERRED EMBODIMENTS

Figure 1:
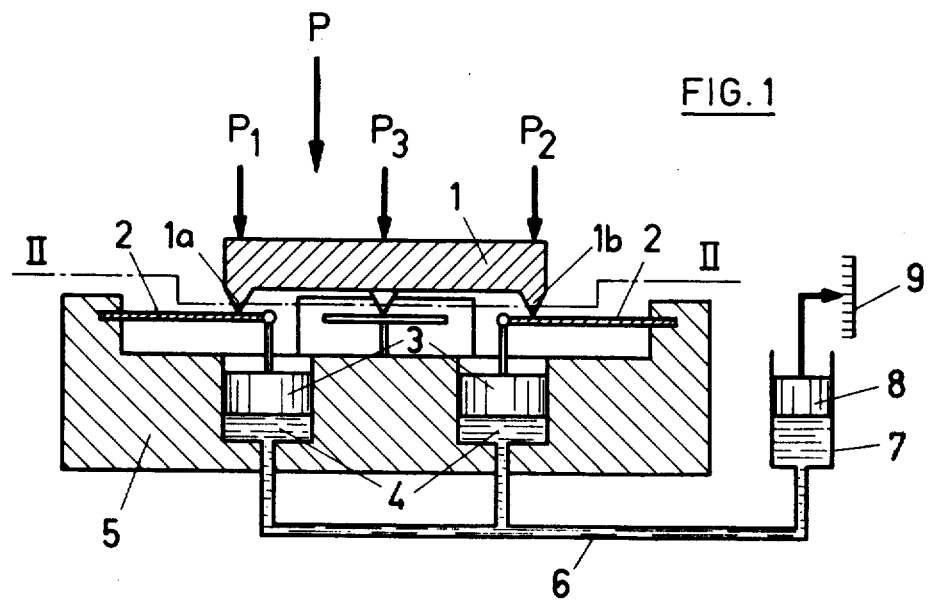
FIG. 1 is a diagrammatic section of a first form of the force measuring device with pistons acting on the liquid in the chamber.
Figure 2:
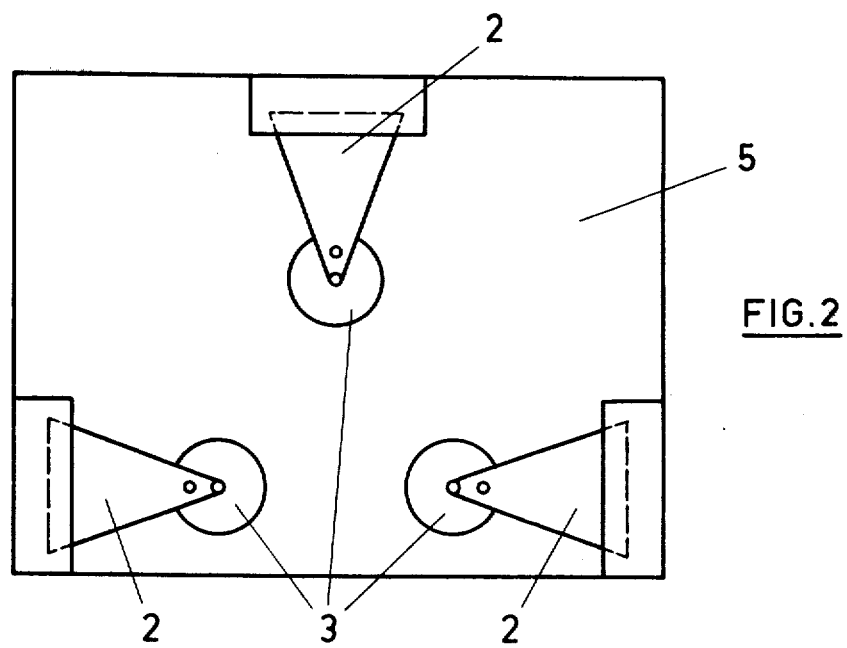
FIG. 2 is a horizontal section taken on the line II—II of FIG. 1.

FIGS. 1 and 2 represent the invention as a device for the measurement of a force P in a simple form. Said force can be applied on any point of plate 1. Plate 1 rests on three identical spring elements 2 by means of its three points $1a$, $1b$ and $1c$. The three spring elements are in turn loaded by the three force components $P_1$, $P_2$ and $P_3$. On all three spring elements 2, the force is applied in the same position (as can be seen in FIG. 2) so that all spring elements are loaded in an identical way. The sum of the components $p_1$, $P_2$ and $P_3$ is equal to the force P, whereby their magnitudes depend upon the location of P on the plate 1. Provided that they remain small, the deformations of the spring elements 2 are proportional to the forces $P_1$, $P_2$ and $P_3$ and they are imposed onto three identical pistons 3, which slide in three identical liquid filled cylindrical cavities 4 of a base member 5. In the cylinders 4, the pistons 3 displace each a quantity of liquid, which is in turn proportional to the force $P_1$, $P_2$, or $P_3$. A line 6 connects the three cylinders 4 with each other and also with a cylinder 7,. In cylinder 7 the piston 8 is displaced by the combined actions of the three pistons 3. The amount of liquid introduced into cylinder 7 is thereby equal to the sum of the quantities displaced by the pistons 3 in cylinders 4. The displacement of piston 8 is therefore proportional to the sum of the three force components $P_1$, $P_2$ and $P_3$ and represents a direct measure of the force P. It can be read off directly from the scale 9. Consequently here 7, 8 and 9 are the indicator device.

Figure 3:
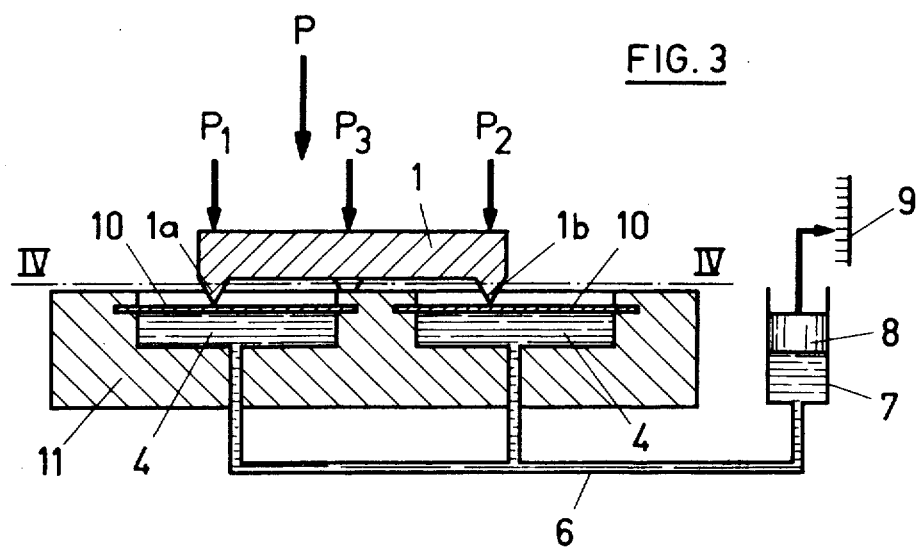
FIg. 3 is a diagrammatic section similar to FIG. 1 of a second form of the invention.
Figure 4:
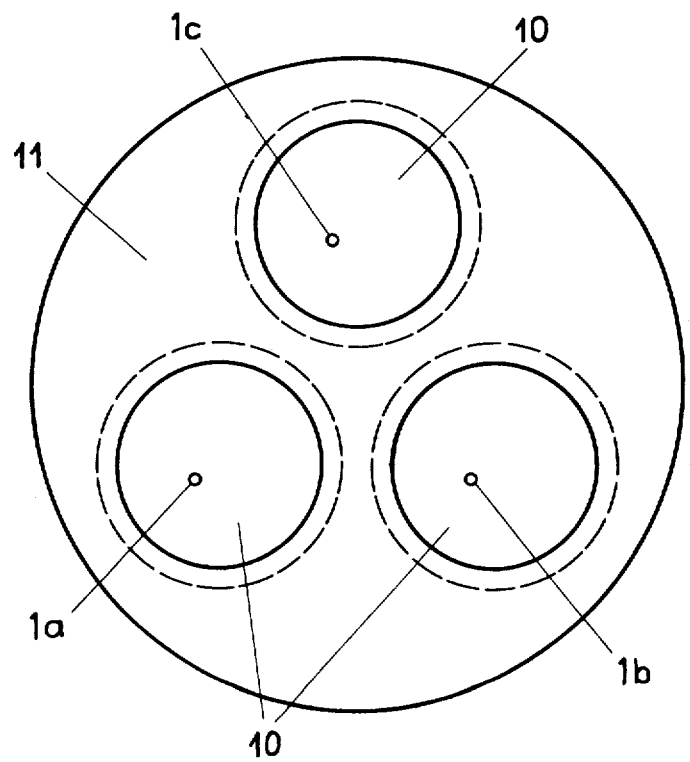
FIg. 4 is a horizontal section taken on the line IV—IV of FIG. 3, FIGS. 5, 6 and 7 are three diagrammatic sections similar to FIG. 1 of three further forms of the invention.

In this form of the invention, the spring elements 2 are obviously also the gauge elements, plate 1 is the member distributing the applied force on to the gauge elements 2, the deformation of the gauge and spring elements 2 is imposed on to a wall —i.e. the piston 3 —of a liquid chamber, which is formed here by the base 5 with its cylinders 4 and the connected tubing 6. From what is mentioned above, it is clear that the gauge element is conceived as a spring element in the deformable regions, whereby all spring elements are equal in every respect and are positioned relative to the distributing member as well as relative to the liquid chamber in such a way that the spring characteristic is the same for all spring elements, that said deformation remains in the linear domain of said spring characteristic and that the local change of volume of said liquid chamber is proportional to the deformation of said spring element, the factor of proportionality being the same for all spring elements. In the form of the invention shown in FIGS. 3 and 4 (and in an analog way also in the forms shown in FIGS. 5, 6, 7 and 8) each circular spring element 10, which is sealingly-fixed in the base 11 also plays the role of the pistons 3 in FIGS. 1 and 2. The points $1a$, $1b$ and $1c$ of force application are identically located on all spring elements 10, even though they do not need to lie in the center of the spring elements as shown in FIG. 4. Otherwise, the principle of operation is the same as in the first form of the invention. In particular the deformations displace quantities of liquid which are proportional to the force components.

It is understood that in these first two forms of the invention the number of spring elements 2 or 10 — and their related parts — can be higher than three.

The forms of the invention described in the following posses only one single spring element having circular symmetry and one single liquid filled chamber with unchanged functions.

Figure 5:
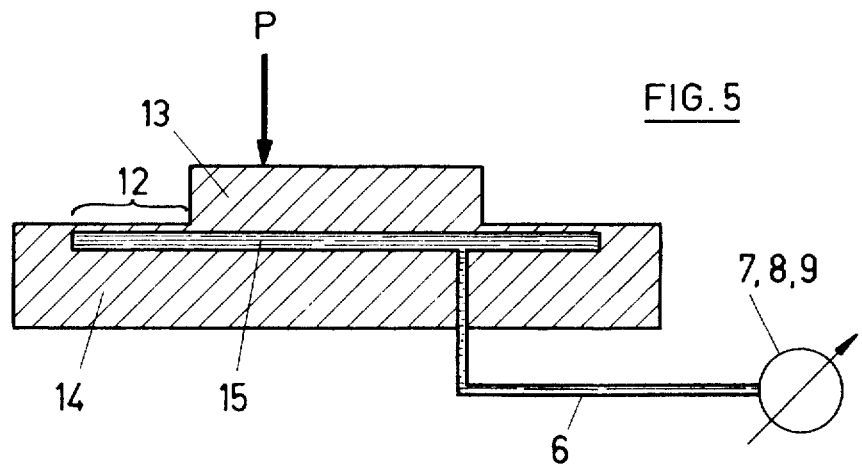
Figure 6:
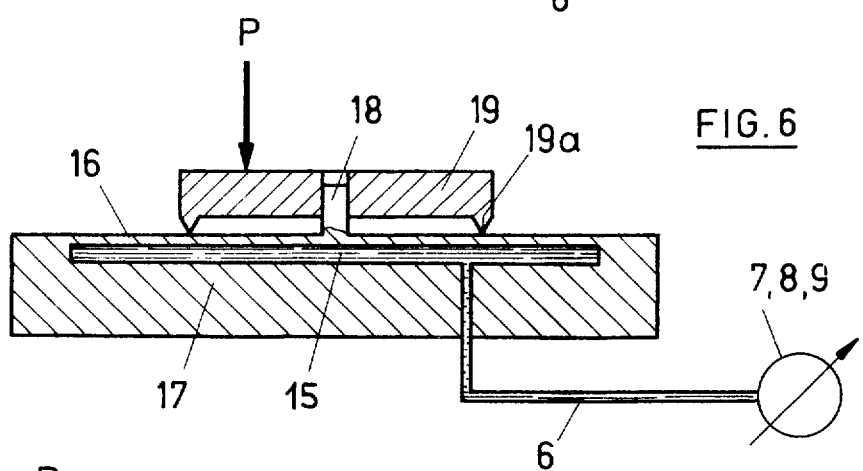

FIG. 5 shows one of the possible forms, in which the single spring element 12, in the shape of a flat ring, is at the same time part of the wall of the flat circular liquid chamber 15. This spring element 12 is connected in a tight way (sealed) to the stiff circular distributing member 13 along its inner edge and with the base 14 along its outer edge. In particular, the spring element 12 as well as the distributing member 13 and the base 14 can consist of one single piece as shown in FIG. 5. In the form shown in FIG. 6, the spring element 16 is a circular disc which is connected in a tight way along its periphery with the base 17 and carries a central pin 18. This pin fits into the central hole of the distributing member 19, which rests on the spring element 16 by means of the circular edge $19a$. The chamber 15 has the same shape as in the example shown in FIG. 5.

Figure 7:
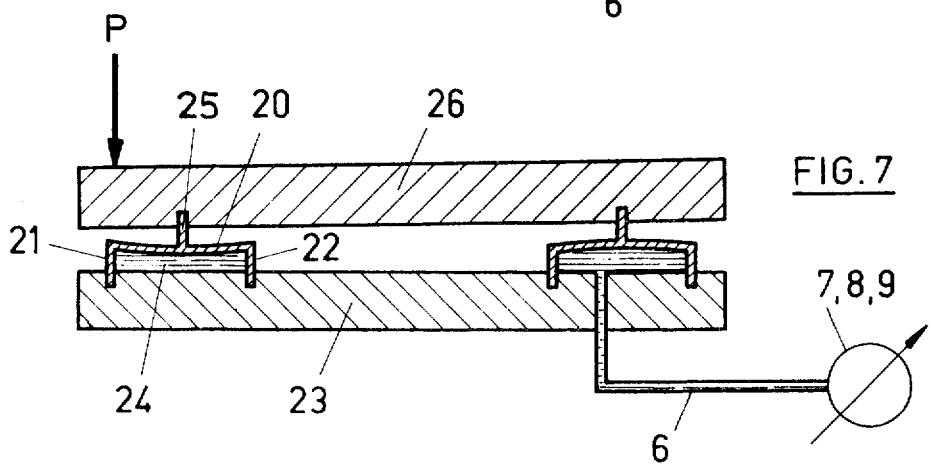

In the form shown in FIG. 7, the spring element 20 consists of the horizontal wall of a gauge element with a U-shaped cross section, which has two side walls 21, 22 extending downwards and connected in a tight way to the base 23. The liquid filled chamber 24, which connects with the indicator device by means of line 6, has the shape of a circular ring. The spring element 20 is connected to the circular distributing member 26 along the whole circumference by means of a circular wall 25 about in the middle between the two side walls 21 and 22. On the distributing member 26, the force P can be applied even outside the circumference of the connecting wall 25. As a result, the spring element will contract the liquid chamber on the side where the force is applied, whereas it will expand the chamber on the opposite side as may be seen in FIG. 6.

Figure 8:
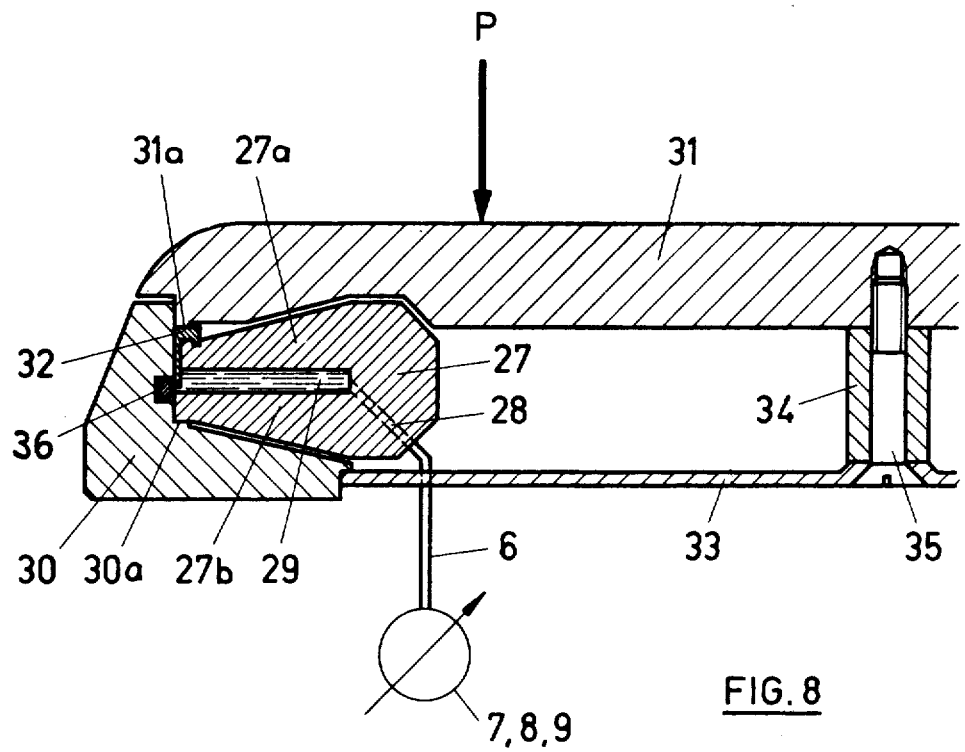
FIG. 8 is a section of another form of the invention showing more design details.

In the form shown in FIG. 8, the gauge and spring element 27 is a ring with U-shaped cross section, whereby the liquid chamber 29, which communicates by means of channel 28 and line 6 with the indicator device 7, 8 and 9, is formed by the narrow slot between the two side walls $27a$ and $27b$ of the spring element. The lower wall $27b$ rests on the narrow shoulder $30a$ of the base 30 only by means of its outer circular edge. The circular and coaxial distributing member 31 rests only with its narrow shoulder $31a$ on the thin ring insert 32, which in turn rests on the outer edge of the upper wall $27a$ of the spring element. The rings 32 and 36 have the purpose of sealing the liquid chamber 29. Parts 33, 34, 35 only serve to keep the distributing member 31 and the base 30 together.

In addition another form of the invention is possible, in which two U-shapes as shown in FIG. 8 are connected together to form a single element with rectangular cross section. The longer walls of the cross section extend in radial direction, whereby the distributing member as well as the base are in contact with the middle of these two longer walls.

Because of the axial symmetry, as realized in the examples of FIGS. 5 to 8, the spring element is subjected to identical clamping and loading conditions all along its circumference. As the force P is generally applied off center, its components, which act on the spring element, are distributed in an uneven way along the circumference. These unevenly distributed force components result in uneven deformations of the spring element along its circumference. The local deformation of the axi-symmetric spring element is everywhere proportional to the local force component. This results from the linear relationship between stress and strain of an elastic spring material (e.g. steel) under th assumption of small deformations. The variable deformations along the circumference are imposed onto the cross section of the circular liquid chamber which is directly adjacent to the spring element. The liquid chamber is subjected to variable changes in cross section along the circumference, having an amount which is everywhere proportional to the local force component. The total change of volume of the liquid chamber is proportional to the sum of all local changes in cross section and therefore also to all local deformations and local force components. As a result, the force P acting on any point produces a proportional measurement signal in form of the change of volume of the liquid chamber.

Besides the forms of the invention having circular symmetry, it is also possible to place one or a number of continuous gauge and spring elements having a long extension into one plane, e.g. in a spiral or a meandering pattern.

Figure 11:
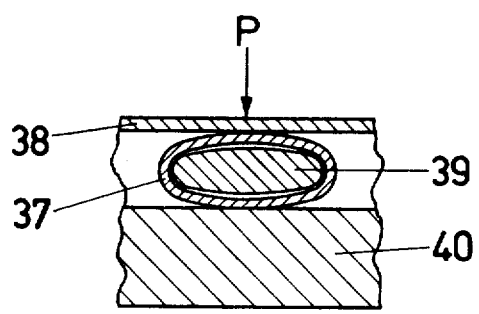
Figure 9:
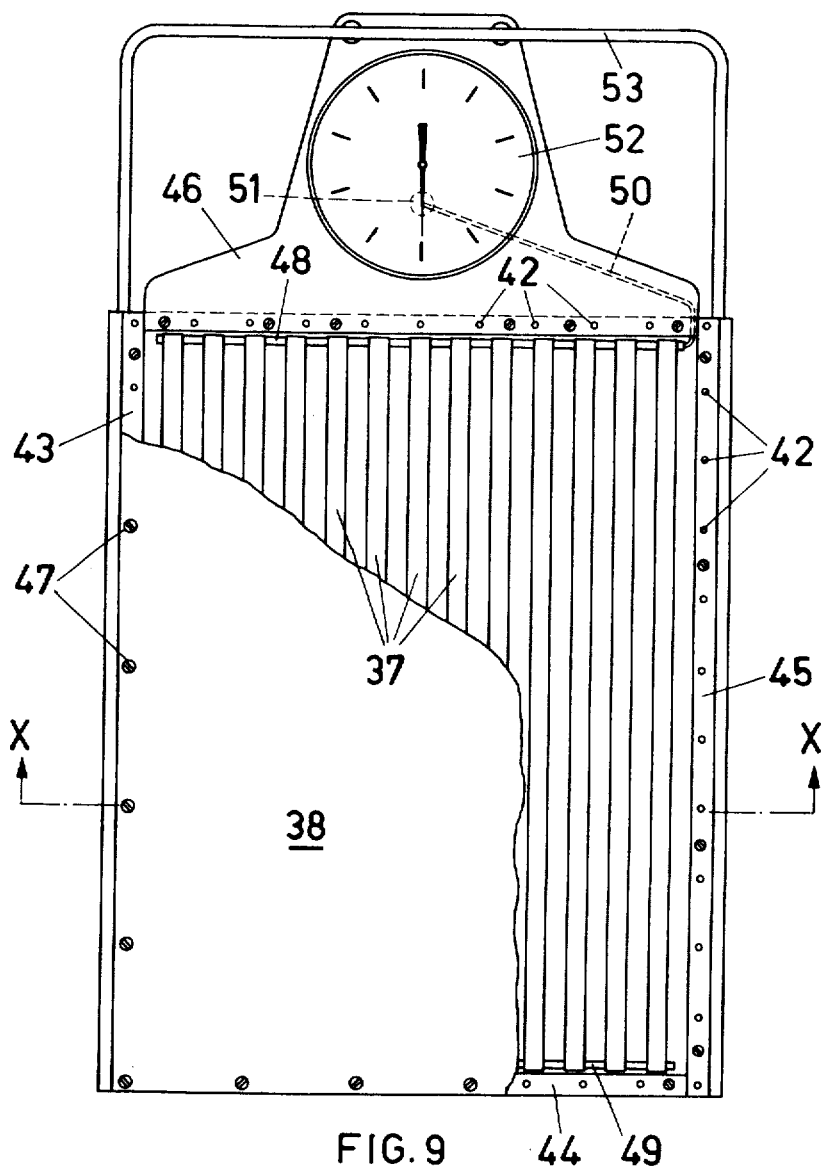
FIG. 9 is a plan view of a further form of the invention.
Figure 10:
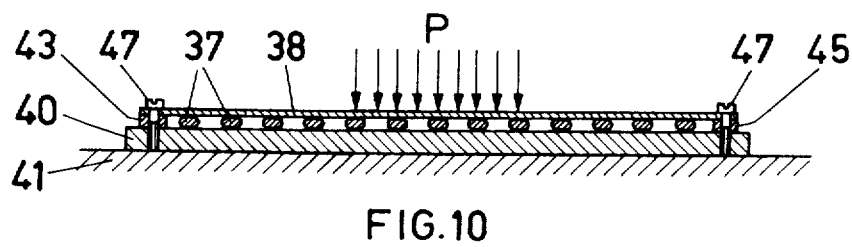
FIG. 10 is a section taken on the line X—X of FIG. 9, and FIG. 11 as a detail from FIG. 10 at larger scale.

As shown by the example in FIGS. 9 to 11, it is also possible to use at least two long linear gauge and spring elements 37 having the same spring characteristic everywhere, which elements change the volume of chamber 37a (see FIG. 11) when loaded by a force. In addition, a plate-like member 38 has to be provided, which is loaded by the applied force and then distributes this one in a continuous way on to the spring elements. Thereby it is of advantage —as realized in this form of the invention — to use a tube with approximately elliptic cross section for the long linear gauge elements 37, the force being applied on the smaller axis of the section as shown in FIG. 11. The approximately elliptic cross section is required — as opposed to a circular section — in order that a deformation will produce a reduction of the volume of the liquid filled chamber.

As shown in FIG. 11, it is also advantageous to introduce a bar element 39 into each gauge element, i.e. tube 37, which bar has the function of limiting the deformation in case of an overload and to reduce the amount of liquid contained in the chamber. These bar elements 39 are preferably made of a material with a smaller heat expansion coefficient than the one of the gauge tubes 37. In this way it is possible to compensate the errors caused by the expansion or contraction of liquid due to temperature changes. If a separate temperature compensating element is still required, this one can accordingly be made smaller.

The form of the invention shown in FIGS. 9 to 11 is further characterized by what follows: A stiff rectangular ground plate 40 is provided which will rest on any flat surface 41 in practical use. Rectangular bars 43, 44, 45 are attached on three sides of this ground plate 40 by means of pins or other equivalent means (indicated by 42 in FIG. 9), the thickness of which bars corresponds exactly to the smaller diameter of the elliptic cross section of tubes 37. A plate 46 is attached in a similar way on the fourth side. A number of gauge tubes 37 as described above is arranged in a parallel way to rest on the ground plate 40, which tubes contain a bar element 39 each and are otherwise filled with liquid. The distributing member 38 in the shape of a plate rests on the tubes 37 and is fastened to the ground plate 40 by means of screws 47, which traverse the bars 43 to 45 and the plate 46. The tubes 37 are closed on both ends by plugs (not shown) and are traversed by the two smaller tubes 41 and 49, which are soldered to them in a tight way. These tubes 48 and 49 have holes inside each tube 37, by means of which they communicate with the interior of the gauge tubes 37. Tube 48 is connected to a bellows cylinder by means of tube 50. This bellows cylinder is part of an indicator device 52 fixed to the plate 46, which indicator serves, as mentioned above, to measure and display the amount of liquid displaced from the tubes 37 as a result of an applied force. It is clear that the total liquid filled internal volume of the system comprising the gauge tube 37, the tubes 48, 49, 50 and the bellows 51 must be carefully degassed.

The tubular member 53, attached to the ground plate 40, serves to displace or carry the force measuring device.

The form of the invention described last can be manufactured at low cost and has proved to be very practical as a result of its small thickness. Practical tests have proved that the correct value of the applied force is always indicated, regardless of whether the force is applied over a large or concentrated area and whether it is applied in the middle or more near the edges of plate 38.

The resulting measurement signal — this also applies to the forms of the invention shown in FIGS. 1 to 4 — can be transformed, transmitted and indicated in different ways:

a. The change of volume of the liquid chamber displaces part of the liquid and thereby moves a guided liquid column in a capillary tube provided with a scale or it moves an indicator piston 8 in a cylinder 7 as shown in FIGS. 1 and 3, b. the change of a volume of the liquid chamber displaces part of the liquid into a bellows type cylinder, similar to the one found in a barometer, which cylinder has only a very small elastic resistance to deformation, and the resulting deformation is amplified and indicated by means of a mechanism similar to what is found in an aneroid baromter; this solution is applied in the form of the invention shown in FIGS. 9 to 11, c. the change of volume of the liquid chamber compresses the liquid and thereby generates a corresponding pressure, which can be measured for example with a manometer; suitable measures have to be taken, e.g. by the proper choice of the manometer, to keep the generated pressure low, because otherwise the gauge and spring elements cannot fulfill the role specified by the invention.

It should also be mentioned that in practice the trapped amount of liquid has a temperature dependent volume. The resulting changes of volume can be compensated before the measurement is made by adjusting for example a screw, which protrudes into the liquid chamber. Another possibility is to provide the liquid chamber with an individually operating temperature compensating element.

What is claimed is:

1. A weight measuring device, comprising a base adapted to rest on the ground and having a plane upper face; an assembly of a plurality of regularly-spaced tubular spring elements arranged on said plane upper face of said base, said tubular spring elements being equal to each other in every respect, having a substantial elliptic cross-section, and being elastically deformable, and a smaller axis extending perpendicular to said base; a pressure transmitting plate having a plane lower face overlapping said assembly and contacting each of said tubular spring elements over its full length and being secured to the edges of said base and being adapted to be loaded by said weight for transmitting it to said tubular spring elements; a gauge, secured to one side of said base; connecting means, connecting the hollow insides of said tubular spring elements together and to said gauge; the system consisting of said tubular spring elements, said connecting means and said gauge being liquid tightly closed; a liquid completely filling said system; said gauge being adapted to measure a change of volume of said liquid in said gauge, resulting from a deformation of one or a plurality of said tubular spring elements upon application of said weight on said transmitting plate, said gauge being calibrated in units of weight and said deformations of said tubular spring element remaining in the linear domain of the spring characteristic of said tubular spring elements at least in the calibrated range of weight.

2. A force measuring device as claimed in claim 1, wherein a bar element is arranged in each of said tubular spring elements to limit its deformation in case of an overload and to reduce the amount of liquid contained in said system.

3. A force measuring device as claimed in claim 2, wherein the bar element consists of a material with a smaller heat expansion coefficient than the one of the tubular spring element.

* * * * *